United States Patent Office

3,356,693
    Patented Dec. 5, 1967

3,356,693
    α,α-BIS-(4-ANILINO-3-NITRO-BENZAMIDO)-ANTHRAQUINONES
    Ernst Reich, Bettingen, and Werner Dettwiler, Neuallschwil, Switzerland, assignors to Ciba Limited, Basel, Switzerland, a Swiss company
    No Drawing. Filed Jan. 17, 1964, Ser. No. 338,298
    Claims priority, application Switzerland, Jan. 22, 1963, 719/63
    3 Claims. (Cl. 260—377)

The present invention relates to new nitro-dyestuff pigments and a process for their manufacture.

The present invention provides nitro-dyestuff pigments of the formula (1)
    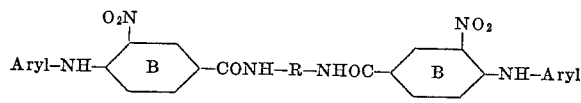

in which the aryl radicals may be for example, naphthalene radicals, or more especially benzene radicals, R represents an aromatic radical, advantageously a 1:5-anthraquinonyl radical, and the benzene radicals B may contain further substituents that do not impart solubility in water.

The new dyestuffs can be obtained by condensing a halide of a carboxylic acid of the formula (2)
    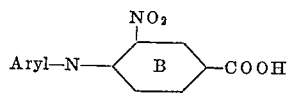

with an aromatic diamine in a molar ratio of 2:1.

The carboxylic acid halides of the formula (2) that are used in the process of the invention, are advantageously obtained by condensing a 3-nitro-4-halogen-benzoic acid with an arylamine, especially an aminobenzene, for example, aniline, halogenated anilines, for example, ortho-, meta- or para-chloraniline, ortho-, meta- or para-bromaniline, 2:5-dichloraniline, alkyl-, alkoxy- or phenoxy-anilines, for example, ortho-, meta- or para-methylaniline, ortho-, meta-, or para-methoxy-, ethoxy- or phenoxyaniline, 2:4- or 2:5-dimethylaniline or a monoacylated diaminobenzene, for example, monoacetyl- or monobenzoyl-para-phenylenediamine. Suitable polycyclic arylamines are 1- or 2-aminonaphthalene, para-amino-diphenyl and 3-amino-pyrene. The condensation products obtained, for example, the one obtained from 3-nitro-4-halogen-benzoic acids and aniline, may be treated with halogenating agents, for example bromine.

As starting materials for the process of the invention, it is advantageous to use halides of carboxylic acids of the formula (3)
    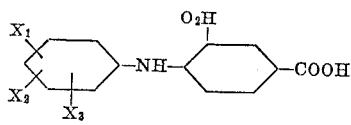

in which $X_1$, $X_2$ and $X_3$ each represents a hydrogen atom or a halogen atom or an alkoxy, phenoxy, alkyl, phenyl or acylamino group.

Preferably, 1:5 - diaminoanthraquinone is used as the aromatic diamine to be reacted with the acid halides.

There may also be mentioned, diamines of the benzene and diphenyl series, for example, those of the formula (4)
    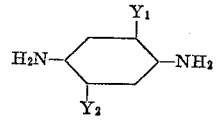

in which $Y_1$ and $Y_2$ each represents a hydrogen atom or a halogen atom or an alkyl or alkoxy group. As examples, there may be mentioned the following diamines:

1:3-diaminobenzene,
    1:3-diamino-4-chlorobenzene,
    1:3-diamino-4-methylbenzene,
    1:3-diamino-4-methoxybenzene,
    1:4-diaminobenzene,
    1:4-diamino-2-methylbenzene,
    1:4-diamino-2-chlorobenzene,
    1:4-diamino-2:5-dimethylbenzene,
    1:4-diamino-2-methyl-5-chlorobenzene,
    1:4-diamino-2-methoxybenzene,
    1:4-diamino-2:5-dimethoxybenzene,
    1:4-diamino-2:5-diethoxybenzene,
    1:4-diamino-2:5-dichlorobenzene,
    1:3-diamino-4:6-dinitrobenzene,
    1:3-diamino-4:6-dimethylbenzene,
    1:3-diamino-4:6-dichlorobenzene,
    1:5-diaminonaphthalene,
    4:4'-diaminodiphenyl,
    3:3'-dimethoxy-4:4'-diaminodiphenyl,
    3:3'-dimethyl-4:4'-diaminodiphenyl,
    3:3'-diethoxy-4:4'-diaminodiphenyl,
    3:3'-dichloro-4:4'-diaminodiphenyl,
    2:7-diaminodiphenylene-oxide,
    1:4-diaminoanthraquinone,
    1:5-diaminoanthraquinone,
    2:6- or 2:7-diaminoanthraquinone,
    2:8-diaminochrysene,
    2-(4'-aminophenyl)-6-aminobenthiazole, and
    2:7-diaminocarbazole.

The condensation is advantageously carried out in an inert organic solvent, for example, in nitrobenzene, preferably at a raised temperature and, if necessary, in the presence of an agent capable of binding acid, for example, pyridine.

The products obtained by the process of the invention are yellow and orange to brown pigments, that are sparingly soluble in all organic solvents and that are suitable for coloring a very wide variety of organic products, for example, plastic substances such as caoutchouc and casein, polymerization resins for example polyvinyl chloride and copolymers thereof, polyvinyl acetals, polyethylene, polypropylene, polystyrene and the copolymers thereof with polyesters prepared from unsaturated dicarboxylic acids and diols, polyacrylates and the copolymers thereof, silicone and silicone resins. The pigments obtained by the process of the invention are also suitable for use in the manufacture of colored condensation resins, especially aminoplasts, for example, urea-formaldehyde and melamine-formaldehyde resins, polyaddition resins for example epoxy resins, polyurethane resins and alkyd resins, and in the manufacture of colored lacquers that contain one or more of the aforementioned resins in an organic solvent, or aqueous emulsions containing one or more of the aforementioned resins or precondensates, if desired or required, in the presence of organic solvents, for example, an oil-in-water emulsion or a water-in-oil emulsion. Such emulsions are suitable mainly for impregnating or printing textiles and other sheet-like structures, for example, paper, leather and fabrics made of glass fibers, if desired or required, with subsequent curing by heat treatment. The pigments obtained by the process of the invention may also be used in the manufacture of spun-colored fibers, for example, fibers made of viscose, cellulose esters and polyacrylonitrile. They are also suitable for use in the manufacture of cosmetic preparations and printing inks.

The pigments, which are generally obtained from the synthesis in a form suitable for use, are advantageously converted into a finely divided state, before application. For example, the crude pigment may be ground, either in the dry state or after being moistened with water, in the presence or absence of an organic solvent and/or a salt that can be washed out.

The pigments obtained by the process of the invention may be used either as they are as so-called toner, or in the pends on the purpose for which the preparations are in a finely divided state, the particles advantageously having a diameter not exceeding $3\mu$. Such preparations, which may also contain the usual additives, for example, dispersing agent or binders may be prepared in known manner by an intensive mechanical treatment, for example, on a roller mill or in a suitable kneading apparatus. The kind of medium used, which acts as dispersing agent and which permits the intensive mechanical treatment, depends on the purpose for which the preparations are intended. For example, if it is necessary that the preparations are capable of forming a dispersion in water, sulfite waste liquor or salts of dinaphthylmethandisulfonic acid are used, but if they are to be used in the preparation of acetate rayon spinning solutions, cellulose acetate mixed with a small amount of solvent is used.

The favorable physical form in which the products produced according to the process of the invention are usually obtained, their chemical inertness and good thermostability enable them to be easily dispersed in the formulations and preparations of the kind defined above. It is advantageous for the dispersion to take place at a stage in the processing before the said formulations or preparations have acquired their final shape. The various shaping operations for example spinning, pressing, curing, casting or cementing, may also be carried out in the presence of the pigments of the invention without detriment to any chemical reactions of the substratum, for example, further polymerization, condensation or polyaddition.

The following examples illustrate the invention. Unless otherwise stated, the parts and percentages are by weight.

EXAMPLE 1

74 parts of 3 - nitro - 4 - (4' - bromophenyl)-aminobenzene - 1 - carboxylic acid (obtained by brominating 3 - nitro - 4 - phenylamino - 1 - carboxylic acid in glacial acetic acid), 1 part of pyridine and 27.5 parts of thionyl chloride were heated to 90 to 100° C. in 250 parts by volume of nitrobenzene, while stirring, in a round-bottomed flask provided with stirring means, a condenser and a thermometer, and maintained at that temperature for 30 minutes, whereby the 3 - nitro - 4 - (4'-bromophenyl)-aminobenzene - 1 - carboxylic acid chloride that formed with the usual evolution of gas was dissolved completely. A solution of 19.6 parts of 2:5 diethoxy-1:4-diaminobenzene in 350 parts by volume of nitrobenzene having a temperature of 90 to 100° C., was added to the solution, and precipitation occurred. The mixture was then heated to approximately 180° C., and stirred at that temperature for approximately 15 hours. After cooling the reaction mixture to room temperature, the product of the reaction was filtered off and then washed successively on the suction filter with chlorobenzene and alcohol. After recrystallization from γ-butyrolactone, analysis gave the following figures:

Calculated: C, 51.82%; H, 3.62%; N, 10.07%; Br, 19.15%. Found: C, 52.02%; H, 3.81%; N, 10.09%; Br, 18.65%.

The product corresponds to the formula

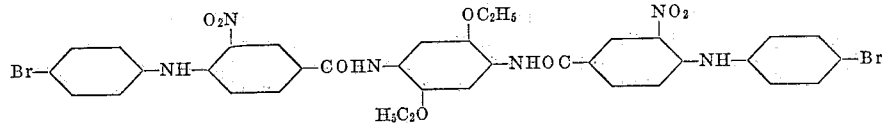

When used for the mass coloration of polyvinyl chloride, the pigment yielded yellow tints possessing a good fastness to light and a good fastness to migration.

Coloration process 5 parts of the above pigment were mixed with 95 parts of dioctyl phthalate and the mixture ground in a ball mill until the pigment was smaller than $3\mu$.

0.8 part of this dioctyl phthalate paste was mixed with 13 parts of polyvinyl chloride, 7 parts of dioctyl phthalate and 0.1 part of cadmium stearate, and the mixture was then worked to and fro on a two-bowl mill for 5 minutes at 140° C. A reddish yellow foil was obtained.

By condensing 1 mol of 2:5-diethoxy-1:4-diaminobenzene with 2 mols of the acid chlorides obtained from the condensation products of 3-nitro-4-chlorobenzene-1-carboxylic acid and the amines listed in column I of the following table by the method described in the first paragraph of this example, there are obtained pigments having the coloration properties listed in column II.

| | I | II |
|---|---|---|
| 1 | Aminobenzene | Colors polyvinyl chloride golden-yellow tints having a good fastness to light and a good fastness to migration. |
| 2 | 1-amino-2-methyl-benzene | Colors polyvinyl chloride yellow tints having a good fastness to light. |
| 3 | 1-amino-2:4-dimethylbenzene | Do. |
| 4 | 1-amino-2:5-dimethylbenzene | Do. |
| 5 | 1-amino-2:4-dimethoxybenzene | When the pigment was added to a viscose spinning solution regenerated cellulose fibers were obtained that were colored yellow-brown tints possessing a good fastness to light and good properties of wet fastness. |

EXAMPLE 2

A solution of 16.8 parts of 2:5-dimethoxy-1:4-diaminobenzene in 500 parts by volume of nitrobenzene, which solution had a temperature of 90 to 100° C. was added to a solution of 3-nitro-4-phenylaminobenzene-1-carboxylic acid chloride in nitrobenzene, which was prepared in the manner described in Example 1 from 56.8 parts of 3-nitro-4-phenylaminobenzene-1-carboxylic acid, and condensation was carried out for 20 hours at about 180° C. After cooling the reaction mixture, the product of the condensation was filtered off, washed with alcohol and then recrystallized from γ-butyrolactone. Analysis gave the following figures.

Calculated: C, 62.96%; H, 4.35%; N, 12.96%. Found: C, 63.12%; H, 4.67%; N, 12.85%.

The product corresponds to the formula

In the same manner, 2 mols of 3-nitro-4-phenylaminobenzene-1-carboxylic acid were condensed with 1 mol of one of the aromatic diamines listed in column I of the following table and pigments having the coloration properties listed in column II were obtained.

|   | I | II |
|---|---|---|
| 1 | 2-methyl-5-chloro-1:4-diaminobenzene. | Colors polyvinyl chloride brilliant yellow tints possessing a good fastness to light and to migration. |
| 2 | 2:5-dimethyl-1:4-diaminobenzene. | Do. |
| 3 | 1:4-diaminobenzene. | Do. |
| 4 | 1:5-diaminonaphthalene. | Do. |
| 5 | 3:3'-dimethoxy-4:4'-diaminodiphenyl. | Colors polyvinyl chloride reddish yellow tints possessing a good fastness to light and to migration. |
| 6 | 3:3'-dichloro-4:4'-diaminodiphenyl. | Colors polyvinyl chloride yellowish orange tints possessing a good fastness to light and to migration. |
| 7 | 2:6-diamino-anthraquinone. | Do. |
| 8 | 1:4-diamino-2-p-toluyl-sulfonyl-benzene. | Colors polyvinyl chloride brilliant yellow tints possessing an excellent light fastness. |

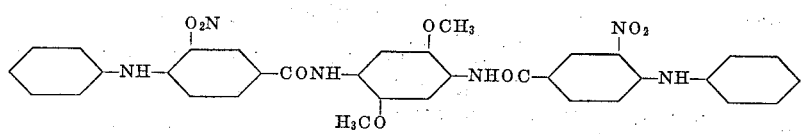

When the pigment was finely dispersed in a viscose spinning solution, the cellulosic fibers spun from the said solution exhibited yellow tints possessing good fastness to light and excellent properties of wet fastness.

*Coloration process*

4.5 parts of the pigment obtained in the manner described in the first paragraph, 4.5 parts of the sodium salt of 1:1'-dinaphthylmethane-2:2'-disulfonic acid and 21 parts of water were ground in one of the known colloid mills, until all the pigment particles were smaller than 1μ.

When this aqueous pigment suspension was added to a viscose spinning solution, the conventional spinning process produced yellow cellulosic filaments. The coloration exhibited good fastness to light and very good properties of wet fastness.

EXAMPLE 3

By condensing 80.3 parts of the product obtained by the monobromination of 3-nitro-4-(2':4'-dimethylphenyl)-aminobenzene-1-carboxylic acid in glacial acetic acid or 80.7 parts of the product obtained by the monobromination of 3-nitro-4-(4'-methoxyphenyl)-aminobenzene-1-carboxylic acid in glacial acetic acid with 13.6 parts of 2:5-dimethyl-1:4-diaminobenzene in the manner described in Example 2, pigments were obtained which yielded greenish yellow tints possessing good fastness to light and very good fastness to migration, when used for the mass coloration of polyvinyl chloride.

EXAMPLE 4

By condensing 56.8 parts of 3-nitro-4-phenylaminobenzene-1-carboxylic acid with 17.7 parts of 2:5-dichloro-1:4-diaminobenzene in the manner described in Example 2, a pigment was obtained which yielded brilliant yellow tints, possessing good fastness to light and to migration, when used for the mass coloration of polyvinyl chloride.

EXAMPLE 5

By condensing 74 parts of 3-nitro-4-(4'-bromophenyl)-aminobenzene-1-carboxylic acid (obtained by brominating 3-nitro-4-phenylamino-1-carboxylic acid in glacial acetic acid) with 27.2 parts of 3:3'-diethoxy-4:4'-diaminodiphenyl, a pigment was obtained which yielded transparent golden yellow tints possessing good fastness to light and very good fastness to migration when used for the mass coloration of polyvinyl chloride.

By replacing 3-nitro-4-(4'-bromophenyl)-aminobenzene-1-carboxylic acid with 64.4 parts of 3-nitro-4-(3'-chlorophenyl)-aminobenzene-1-carboxylic acid (obtained by condensing 3-nitro-4-chlorobenzene-1-carboxylic acid with 3-chloraniline), a pigment was obtained which yielded yellow tints possessing good fastness to light and very good fastness to migration, when used for the mass coloration of polyvinyl chloride.

EXAMPLE 6

By condensing 63.4 parts of 3-nitro-4-(4'-methoxyphenyl)-aminobenzene-1-carboxylic acid or 80.7 parts of the product obtained by the monobromination of 3-nitro-4-(4'-methoxyphenyl)-aminobenzene-1-carboxylic acid in glacial acetic acid with 19.8 parts of 2:7-diaminodiphenylene oxide, pigments were obtained which yielded transparent yellow tints possessing good fastness to light when used for the mass-coloration of polyvinyl chloride.

EXAMPLE 7

A solution of 10.8 parts of 1:3-diaminobenzene in 270 parts by volume of nitrobenzene was added to a solution of 3-nitro-4-phenylaminobenzene-1-carboxylic acid chloride in nitrobenzene, which was prepared in the manner described in Example 1 from 56.8 parts of 3-nitro-4-phenylaminobenzene-1-carboxylic acid, and the whole was stirred for approximately 15 hours at approximately 180° C. The hot yellow-brown solution was then filtered until clear, and the filtrate was then cooled to room temperature. The yellow condensation product that gradually precipitated was filtered off after some time, washed successively with chlorobenzene and alcohol, and then dried in vacuo at about 100°. It corresponds to the formula

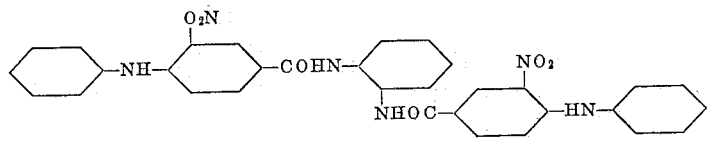

and analysis gives the following figures.

Calculated: C, 65.30%; H, 4.11%; N, 14.28%. Found: C, 65.47%; H, 4.10%; N, 14.12%.

When used for the mass coloration of polyvinyl chloride, the pigment yielded brilliant, transparent yellow tints possessing very good fastness to light.

By replacing in paragraph 1 the 1,3-diaminobenzene by 1,3-diamino-4-chlorobenzene or 1,3-diamino-4-methylbenzene pigments are obtained which also impart to polyvinyl chloride brilliant, transparent yellow tints possessing excellent fastness to light.

EXAMPLE 8

A solution of 3-nitro-4-(4'-bromophenyl)-aminobenzene-1-carboxylic acid chloride in nitrobenzene, prepared in the manner described in Example 1, was mixed with a suspension of 23.8 parts of 1:5-diaminoanthraquinone in 500 parts by volume of nitrobenzene, the whole was heated to about 180° C. and then stirred for 20 hours at that temperature. After cooling the reaction mixture to about 100° C., the reaction product was filtered off and then purified by stirring in boiling nitrobenzene, filtering off at about 100° C., stirring in boiling alcohol, filtering off and washing with alcohol. When the condensation product had been dried, analysis gave the following figures.

Calculated: C, 54.81%; H, 2.76%; N, 9.59%; Br, 18.22%. Found: C, 54.80%; H, 2.64%; N, 9.40%; Br, 17.46%.

The product corresponds to the formula

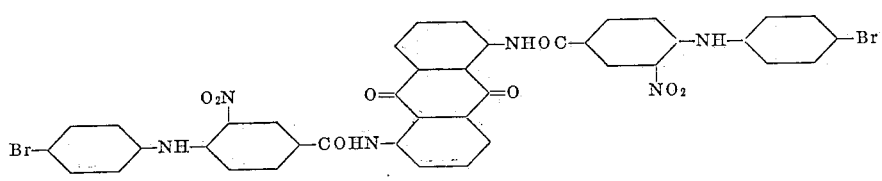

When applied by the coloration process described in Example 1, the pigment colored polyvinyl chloride reddish yellow tints possessing very good fastness to light and to migration.

When used in the spin-coloration of viscose, it yielded yellowish orange tints possessing a good fastness to light and good properties of wet fastness.

By condensing 1 mol of 1:5-diaminoanthraquinone with 2 mols of one of the acid chlorides obtained from the condensation product of 3-nitro-4-chlorobenzene-1-carboxylic acid and one of the amines listed in column I of the following table, by the method described in the first paragraph, a pigment was obtained having the coloration properties given in column II.

| | I | II |
|---|---|---|
| 1 | Aminobenzene | When the pigment was added to a viscose spinning solution, regenerated cellulose fibers were obtained that were colored yellowish orange tints possessing a good fastness to light and excellent properties of wet fastness. |
| 2 | 1-amino-3-methylbenzene | Colored polyvinyl chloride yellowish orange tints possessing a good fastness to light. |
| 3 | 1-amino-4-methylbenzene | Colored polyvinylchloride reddish yellow tints possessing good fastness to light. When the pigment was added to a viscose spinning solution, regenerated cellulose fibers were obtained that were colored yellowish orange tints possessing good fastness to light and excellent properties of wet fastness. |
| 4 | 1-amino-3:5-dimethylbenzene | Colored polyvinyl chloride orange tints possessing good fastness to light. |
| 5 | 1-amino-2-methoxybenzene | When the pigment was added to a viscose spinning solution, regenerated cellulose fibers were obtained that were colored yellowish orange tints possessing good fastness to light and excellent properties of wet fastness. |
| 6 | 1-amino-3-methoxybenzene | Do. |
| 7 | 1-amino-4-methoxybenzene | Colored polyvinyl chloride orange tints, possessing good fastness to light. When the pigment was added to a viscose spinning solution, regenerated cellulose fibers were obtained that were colored orange tints, possessing good fastness to light and good properties of wet fastness. |
| 8 | 1-amino-2:4-dimethoxybenzene | When the pigment was added to a viscose spinning solution, regenerated cellulose fibers were obtained that were colored yellowish orange tints, possessing good fastness to light and good properties of wet fastness. |
| 9 | 1-amino-2:4-dibromobenzene | Colored polyvinyl chloride reddish yellow tints, possessing good fastness to light. When the pigment was added to a viscose spinning solution, regenerated cellulose fibers were obtained that were colored yellowish orange tints, possessing good fastness to light and good properties of wet fastness. |

EXAMPLE 9

A suspension of 23.8 parts of 1:4-diaminoanthraquinone in 500 parts by volume of nitrobenzene was added to a solution of 3-nitro-4-phenylaminobenzene-1-carboxylic acid chloride, obtained in the manner described in Example 2, and condensation was carried out for 60 to 65 hours at about 180° C. while stirring vigorously.

After cooling the reaction mixture to room temperature, the product of the condensation was filtered off, washed successively on the suction filter with chlorobenzene and alcohol and then recrystallized, first from nitrobenzene and then from γ-butyrolactone. Analysis gave the following figures.

Calculated: C, 66.85%; H, 3.65%; N, 11.70%. Found: C, 66.26%; H, 3.65%; N, 11.65%.

The product corresponded to the formula

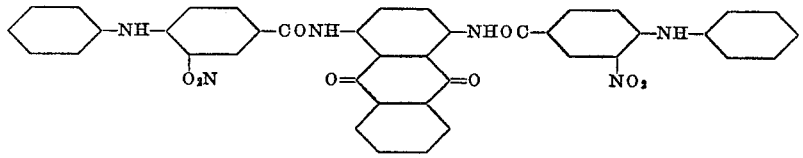

When applied according to the viscose spin-coloration process described in Example 2, the pigment yielded neutral brown tints, possessing very good fastness to light and good properties of wet fastness.

Similar brown tints possessing good fastness to light and good properties of wet fastness were obtained in the spin-coloration of viscose with the condensation products of 1 mol of 1:4-diaminoanthraquinone and 2 mols of 3-nitro-4-(4'-methylphenyl)- or 3-nitro-4-(4'-methoxyphenyl)- or 3-nitro-4-(4'-bromophenyl)-aminobenzene-1-carboxylic acid chloride. Furthermore, these 3 pigments produced yellowish brown tints having good fastness to light, when incorporated into polyvinyl chloride.

What is claimed is:

1. A nitro-dyestuff pigment of the formula

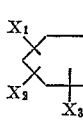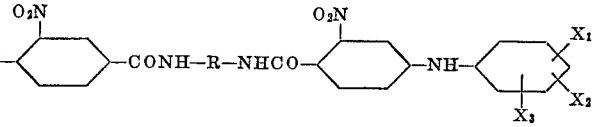

in which R is α,α-anthraquinonylene and $X_1$, $X_2$ and $X_3$ each represents a member selected from the group consisting of hydrogen, halogen, lower alkoxy and lower alkyl.

2. The dyestuff of the formula

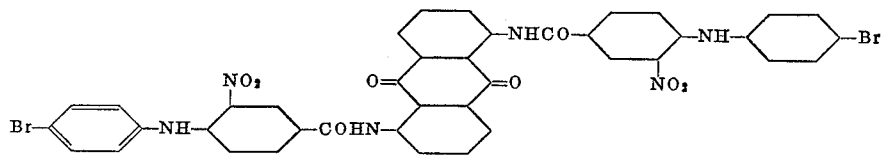

3. The dyestuff of the formula

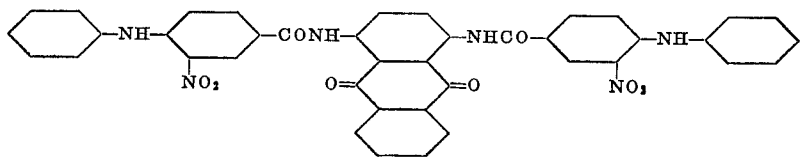

References Cited

FOREIGN PATENTS 11,440 5/1911 Great Britain.
1910

LORRAINE A. WEINBERGER, *Primary Examiner.*

H. C. WEGNER, *Assistant Examiner.*